United States Patent
Clapton et al.

(10) Patent No.: US 6,192,237 B1
(45) Date of Patent: *Feb. 20, 2001

(54) CALL SET-UP PROCESS

(75) Inventors: Alan J Clapton; Sunil Chotai, both of Ipswich (GB)

(73) Assignee: British Telecommunications public limited company, London (GB)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/029,572
(22) PCT Filed: Nov. 27, 1997
(86) PCT No.: PCT/GB97/03273
  § 371 Date: Mar. 6, 1998
  § 102(e) Date: Mar. 6, 1998
(87) PCT Pub. No.: WO98/25426
  PCT Pub. Date: Jun. 11, 1998

(30) Foreign Application Priority Data

Dec. 4, 1996 (EP) .................................................. 96308784

(51) Int. Cl.$^7$ ....................................................... H04Q 7/22
(52) U.S. Cl. ........................... 455/422; 455/414; 455/466
(58) Field of Search ..................................... 455/403, 422, 455/434, 414, 466, 461, 450, 452, 560, 456, 457; 370/401, 466, 462

(56) References Cited

U.S. PATENT DOCUMENTS 5,282,250 * 1/1994 Dent et al. ......................... 455/411 X
5,577,103 * 11/1996 Foti ..................................... 455/412
5,583,917 * 12/1996 Jonsson ............................... 455/461
5,600,706 * 2/1997 Dunn et al. ......................... 455/456
5,600,707 * 2/1997 Miller, II ........................... 455/434 X
5,794,142 * 8/1998 Vanttila et al. ..................... 455/419

(List continued on next page.)

*Primary Examiner*—William G. Trost
(74) *Attorney, Agent, or Firm*—Nixon & Vanderhye P.C.

(57) ABSTRACT

The arrangement disclosed allows a user of a mobile telephone 11 to use intelligent network (IN) services specific to his home network, regardless of whether the network 12, 13, 14 to which he is currently connected can support the service. When the user makes an outgoing call attempt (step 1) the associated signalling is transmitted over a signalling channel. The mobile switching centre (MSC) 13 recognises a customer identity (encoded electronically in the call set-up signals) and accesses the data relating to the user which is stored in a register 14. The data in the register 14 relating to the user 11 includes a marking identifying him as an IN served customer, causing the MSC 13 to halt the call process and send a signal (2), protocol, to the service control point (SCP) 15 in the user's home network. The SCP 15 then activates the user's service profile and as part of that profile recognises the need to retrieve additional information from the user 11, e.g. a PIN (personal identity number) or some other information. Having identified the information needed, the SCP initiates a message 3 to the mobile station, for example requesting an authorisation code, which is passed back to the MS 11 by way of the switching centre MSC 13 and base station BSS 12, using a signalling protocol. The user, having received the message 3, responds such that the mobile station 11 sends a second signal 4 by way of the host network back to the SCP 15. The SCP 15 acts on the message received and returns a response 5 to the MSC 13, whereby the MSC 13 will then act on that information for example to set up a call, including a full speech channel if required (6). This system allows data to be transmitted directly between the SCP 15 and the user 11, the host network not requiring to be compatible with the signalling protocols except for the initial and final states 1, 5. Moreover, since signalling channels are used, traffic (speech) channels, which have a larger bandwidth, are not used unless and until the call set-up process is completed.

26 Claims, 1 Drawing Sheet

U.S. PATENT DOCUMENTS

| | | | |
|---|---|---|---|
| 5,839,076 | * 11/1998 | Becher | 455/461 |
| 5,903,845 | * 5/1999 | Buhrmann et al. | 455/461 |
| 5,915,225 | * 6/1999 | Mills | 455/558 |
| 5,920,820 | * 7/1999 | Qureshi et al. | 455/461 |
| 5,924,035 | * 7/1999 | Joensuu | 455/445 |
| 5,930,699 | * 7/1999 | Bhatia | 455/414 |
| 5,966,653 | * 10/1999 | Joensuu et al. | 455/414 |

\* cited by examiner

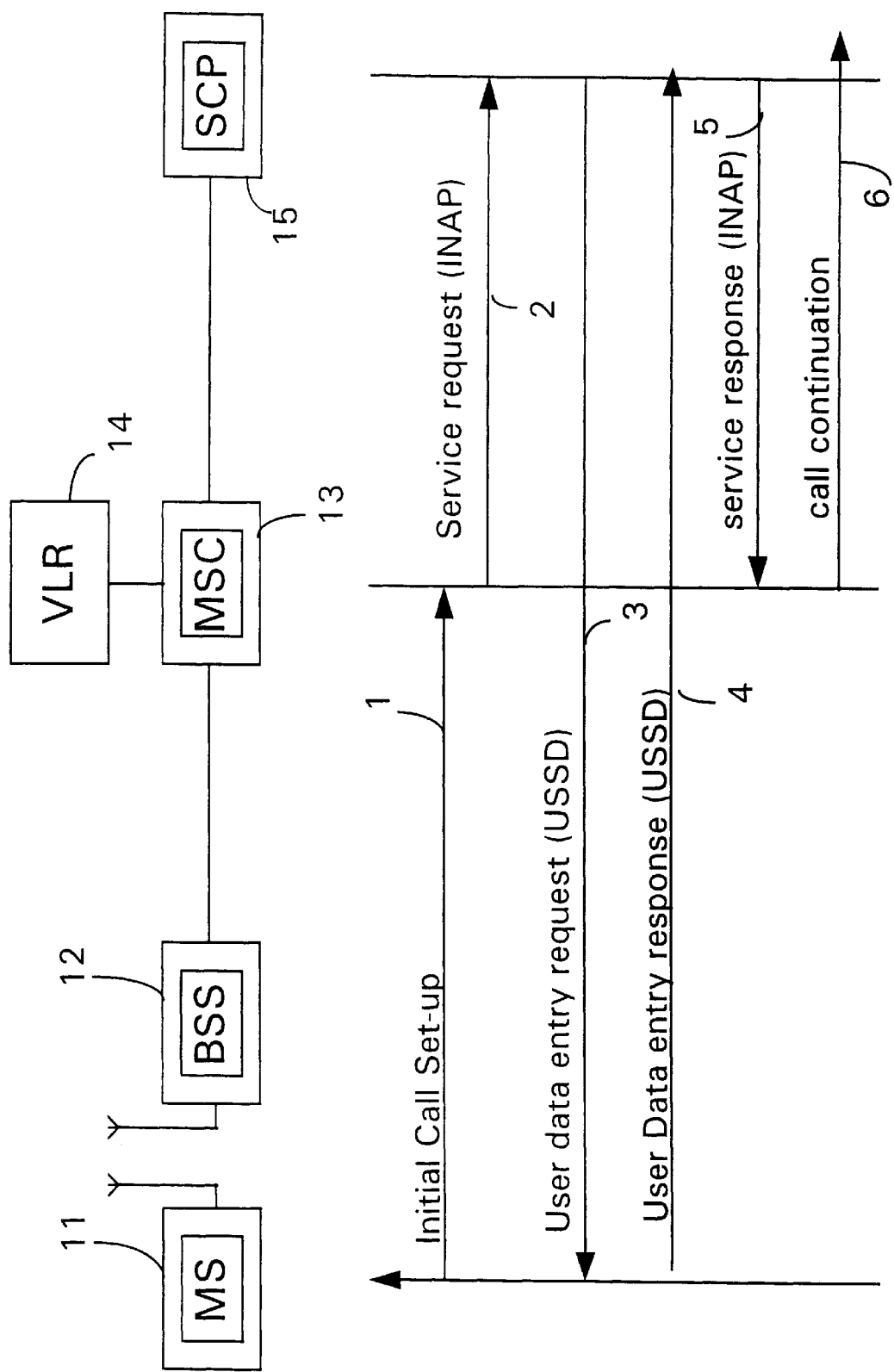

CALL SET-UP PROCESS

This application is the U.S. National phase of International Application No. PCT/GB97/03273, filed Nov. 27, 1977.

BACKGROUND OF THE INVENTION

1. Field of the Invention

This invention relates to telecommunications systems. It is of particular application to the digital cellular radio system known as GSM (Global System for Mobile Communications) but is not limited thereto. The invention is concerned with improving the accessibility of advanced telecommunications services.

2. Related Art

Intelligent networks (IN) have been conceived and developed in order to allow advanced and versatile telecommunications services to be supplied over conventional telephone networks. Some of these services require users to carry out transactions, using their telephones, in addition to the conditional call set-up transaction, and others require modification of the conventional call set-up transaction. Such services include the routing of calls under centralised control, according to factors such as call diversions set up by the called party, number translation services (e.g. to allow connection to different local service providers using the same number from any point within a wide area, by routing the call differently according to the origin of the call) and many other facilities, or to allow the use of special-tariff dialling codes (free, local rate, or premium). Some services require the user to enter information, subsequent to initiating a transaction. For example certain premium rate services require a special user identification number (usually known as a PIN—Personal Identification Number) to be transmitted in order to allow access to the service. This prevents personnel who have access to the telephone from making unauthorised transactions, for example international calls, or calls to premium rate services, whilst still allowing them unhindered access for other categories of transaction such as local or emergency calls.

Intelligent networks have been conceived and developed largely on the basis of an analogue Public Switched Telephone Network (PSTN), i.e. the conventional fixed telephone network. For services which require the user to enter information, subsequent to initiating the transaction, a special resource has to be switched into the connection to play a voice menu, receive DTMF tones, etc. In other words, an analogue-based exchange of information is passed between the user and the special Intelligent Network resource. In general terms the special resource then translates this into a digital signalling message to send to a intelligent network service control system for processing information on the system, such as authorising or barring the transaction attempt.

The digital cellular radio system GSM has started to develop and introduce a comparable IN development under a service description known by the acronym CAMEL (Customer Applications for Mobile Enhanced Logic). In existing proposals for this intelligent Network development, standard analogue collection of information is required in order to control service requests etc. For example, if a mobile station transmits a short-code number using e.g. DTMF tones, the switching centre recognises this as a request for an IN service and transmits this code, together with the mobile station's user identity, to a service controller which identifies the line to which the transaction relates (which may depend on the user code), and routes the transaction appropriately (or fails the transaction if the user is not authorised to use the code). This raises a particular difficulty in that in a cellular system a full speech channel is not normally allocated until a call is ultimately set up. Call set-up is carried out using a narrow-bandwidth signalling channel. This avoids allocation of a speech channel to a call attempt which is not going to succeed.

In the present specification, he term 'signalling connection' is used to identify such narrow-bandwidth channels used for call set-up, et., as distinct from traffic channels.

In order that the voice menu, DTMF tones, etc. can be transmitted using the 'CAMEL' system, a speech channel is required. It is inconvenient to have such channels used for service requests which will not result in a requirement for a speech channel, (e.g. if the transaction is going to fail because the correct authorisation code is not sent).

Moreover, when the mobile station is not operating on its home network, it requires that the current ("host") network can handle the IN service required. This may not be possible as different networks have different capabilities, or may use different signalling protocols, for example using the same short code to signify different services.

The GSM system also has a capability known as the Unstructured Supplementary Service Data (USSD) capability. This service was introduced to allow supplementary service control between a terminal and its home network. This capability provides transmission of a "packet" of data between the terminal and the home network and vice versa, to enable operators to introduce their own special service offerings, allowing users to operate these special services even when not operating on their home network. This capability allows such services to be introduced without the need to modify the mobile station, provided the user is informed of the sequence of keystrokes required to perform it. The system can return codes which the mobile station will recognise, e.g. error code '10' may cause the mobile station to display an appropriate message in a language selected according to the initial programming of the mobile station.

The USSD capability allows the transmission of data direct between the mobile station and the service control system, without any interaction of the switching centre. This is of particular advantage in the context of "roaming", wherein the mobile station operates with a switch belonging to an operator other than its home network. When a terminal is 'roaming' the switch may only be compatible with the terminal to the extend required by the standardisation implicit in the GSM standard, and therefore services specific to the user's "home" network are not necessarily supported by the switch to which the user is currently connected.

It has not so far been possible within the standard GSM protocols to associate the sending of such message packets with a call, to manage specific call-related services in real time. USSD has only been used to update more static customer data, such as setting up a call-forward arrangement representing advice of the user's own telephone number, etc.

SUMMARY OF THE INVENTION

According to the invention there is provided a method initiating a telecommunications transaction, the method comprising the steps of;

setting up a low-bandwidth initial signalling path interconnecting a terminal, a switching centre, and a service control system;

transmitting an initial signal from the terminal to the switching centre over the initial signalling path, transmitting, over the initial signalling path, a first, transaction request, signal from the switching centre to the service control system, according to a first signalling protocol;

transmitting, over the initial signalling path, a second signal from the service control system to the terminal according to a signalling protocol different from the first signalling protocol, transmitting, over the initial signalling path a third signal, in reply to the second signal, from the terminal to the service control system, also according to a signalling protocol different from the first signalling protocol, in response to the third signal, generating a fourth, transaction control, signal for transmission from the service control system to the switching centre to control the transaction.

According to a further aspect of the invention there is provided a service control system for a telecommunications network, the service control system comprising:

means for receiving a first, transaction request, signal according to a first signalling protocol, the transaction request relating to a specified terminal, transmitting means for transmitting a second signal to the specified terminal in relation to which the transaction request is received, the second signal being according to a signalling protocol other than the first signalling protocol;

means for receiving from the said terminal a third signal in response to the transmitted second signal, the third signal being according to a signalling protocol other tan the first signalling protocol;

processing means for processing the third signal to generate an instruction to initiate the required transaction; and means controlled by the processing means for transmitting a fourth, transaction control, signal to a switching means of the telecommunications system instructing the switching means to initiate the transaction to be performed, the signalling protocols used for the first, second, third and fourth signals all being suitable for carrying over a low bandwidth initial signalling path.

By use of this invention, authorisation and any other transaction-related messages can be transmitted directly between the terminal and the user's home network by way of the current "host" switch, without any data processing by the host switch, between establishment of a high-bandwidth full speech channel. The invention avoids the setting up of a high bandwidth connection until it is determined that such a connection is required for the transaction to be performed. It should be noted that the transaction to be performed may differ from that requested, for example if a transaction is requested which is barred to the user making the request.

The service control system may, in response to the third signal, perform the steps of:

determining whether the transaction to be performed requires a high bandwidth communications path, providing such a high bandwidth path only if so required, and initiating the transaction to be performed, the transaction using said high bandwidth path if provided, and using said initial signalling path if no high bandwidth communications path is provided. Accordingly, a speech channel need not be set up by the host switch unless the service control centre in the user's "home" network determines tat such a speech channel is required to support the service requested. For example, even if the requested transaction requires a speech channel, the intelligent network capability does not allocate a speech channel unless the transaction which is in fact to be performed also requires a speech channel.

Services can also be requested which do not require speech channels at all, such as location information, for example to indicate to the user the cost of the current call, which depends on the tariff currently applicable to him (which is set by the home system, not the current 'host' network, but may also depend on the user's present location).

It is convenient for the second and third signals to use the same signalling protocol. In the preferred embodiment this protocol is the USSD protocol discussed above.

It is also convenient for the fourth signal to use the same, first, signalling protocol sued by the initial transaction request signal. In the preferred embodiment this first signalling protocol may be the INAP (Intelligent Network Application Part).

In the preferred embodiment to be described, the system is a cellular radio system, specifically according to the GSM standard. However, the system is applicable to other telecommunications networks, whether mobile or fixed.

The third signal, transmitted form the switching centre to the service control system, may include any information necessary for setting up the service. This may include the identity of the terminal setting up the transaction, an authorisation code (entered manually by the user or automatically, in response to a prompt from the service control system), the location of the terminal, (for example an indication of the base station currently servicing the mobile station), and any other information necessary to support the required service. The location information may be retransmitted to the terminal as part of the exchange of the information.

BRIEF DESCRIPTION OF THE DRAWING

The FIGURE shows the basic elements of a cellular radio system in diagrammatic form, and a flowchart showing the various steps taken in the operation of an exemplary embodiment of the invention.

DETAILED DESCRIPTION OF EXEMPLARY EMBODIMENTS

A mobile station (MS) 11 is in radio communication with a base station system (BSS) 12 forming part of the fixed part of a mobile radio system. The base station is none of several connected to a mobile switching centre (MSC) 13. The switching centre 13 controls the routing of calls to and from mobile stations 11 by way of the base stations 12, transferring the fixed end of the communication link with the mobile station 11 from one base station 12 to another as the mobile station 11 moves. Whilst the mobile station 11 is connected to the switching centre 13 through one of its associated base stations 12, the switching centre has details of the user stored in an associated database known as the Visitor Location Register (VLR) 14. On report of a handover to a base station controlled by another switching centre, this record is deleted, having been added to the VLR associated with the new switching centre. The switching centre MSC 13 is also in communications with an Intelligent Network Service Control Point (SCP) 15, which is part of the home network of the user of the mobile station (MS) 11. The base station BSS 12 plays no part in the signal processing. It is the interface between the fixed (12–15) and mobile 11 parts of the network, and its primary function is as a radio transceiver.

The steps in the process are as follows.

When the user of the mobile unit 11 makes an outgoing call attempt, the associated signalling is transmitted over a signalling channel (step 1). The MSC 13 recognises a customer identity (encoded electronically in the call set-up signals) and accesses the data relating to the user and stored in the VLR 14. The data in the VLR 14 relating to the user 11 includes a flag identifying him as an IN served customer, i.e. this is part of his overall service support, entered and agreed with the mobile service provider when the user initially takes out a contract with the mobile service provider. The user having been recognised as an IN user, the MSC 13 halts the call process (as per standard CAMEL procedure) and sends an initial detection point message (2), according the INAP (Intelligent Network Application Part) protocol, to the service control point SCP 15. The SCP 15 then activates the user's service profile and as part of that profile recognises the need to retrieve additional information from the user 11, e.g. a PIN (personal identity number) or some other information. Having identified the information needed, the SCP initiates a message 3 to the mobile station, for example requesting an authorisation code, which is passed back to the MS 11 by way of the switching centre MSC 13 and base station BSS 12, using the USSD protocols, over the signalling channel. The MSC 11, having received the USSD message 3, may display the contents e.g. on a visual display or as an audible message. The user may then enter any information requested, such as the requested authorisation code, and the mobile station 11 sends a second USSD message 4, containing this information by way of the BSS 12 and MSC 13, back to the SCP 15. The SCP 15 acts on the message received and returns the standard INAP response 5 to the MSC 13, whereupon the MSC 13 will act on that information for example to set up a call, including a full speech channel if required (6).

This system has a number of advantages. Firstly, all of the transactions involved in retrieving information between the MS 11 and the SCP 15 are passed in associated signalling links so there is not need for the time-consuming and difficult process of instructing the switching centre MSC 13 to insert special resources. Another benefit for the mobile system is that by the use of USSD a signalling channel can be used, instead of a traffic (speech) channel. A traffic channel requires eight times as much air interface capacity as a signalling channel. The use of a signalling channel is therefore a much more efficient usage of the spectrum capacity.

The use of this approach means that operator-specific services can be implemented and presented to users in a simple way. As an example it is possible for the SCP 15 to generate a simple menu display and encapsulate a signal in USSD to have that menu displayed to the user, making data entry by the user simple and straightforward. The system only requires IN compatibility between the user equipment (MS) 11 and the service control point SCP 15, which is part of the user's 'home' system (the one to which he pays his subscription). The user can be connected through an MSC 13 of a system other than his home system (a process known as "roaming") whether or not the other system supports the same service to its own subscribers.

The USSD data collection process required by the "CAMEL" capability of GSM is completely independent of the initial call set-up 1 and response 5 from the SCP, so the present embodiment is fully compatible with this capability, and there are no additional developments needed of these capabilities.

Enhancements of the invention allow for the SCP 15 to "notify" the terminal of an event recognised within the SCP 15. An example of tis could be a service wherein the SCP 15 recognises whether the user 11 is making a transaction in an area that is part of the local call zone, and if it is not in that zone a message is delivered to the terminal displaying that the transaction is not at cheap rate. Other service examples are possible, e.g. an indication of current credit available to the user in a pre-paid service option.

A second enhancement makes it possible for the USSD message to be used to retrieve data from the user's terminal 11 at the request of the SCP 15. A service example of this could be the retrieval of a pre-stored PIN. This simplifies services for the user, allowing the user to avoid entry of data for service action.

What is claimed is:

1. A method of initiating a telecommunications transaction with associated at least first, second, third and fourth signals, the method comprising the steps of:

setting up a low-bandwidth initial signalling path interconnecting a transmitting, over the initial signalling path, said first, transaction request, signal from the switching centre to the service control system, according to a first signalling protocol;

transmitting, over the initial signalling path, said second signal in response to the first signal, from the service control system to the terminal, according to a signalling protocol different from the first signalling protocol, to request information for said initiation of said transaction, transmitting, over the initial signalling path said third signal, in reply to the second signal, from the terminal to the service control system, also according to a signalling protocol different from the first signalling protocol, to provide said information, in response to the said third signal, generating said fourth, transaction control, signal for transmission from the service control system to the switching centre to control said transaction.

2. A method according to claim 1, wherein in response to the third signal, there are performed the steps of:

determining whether the transaction to be performed requires a high bandwidth communications path, providing such a high bandwidth path only if so required, and initiating the transaction to be performed, the transaction using said high bandwidth path if provided, and using said initial signalling path if no high bandwidth communications path is provided.

3. A method according to claim 1, wherein the fourth, transaction control, signal is transmitted from the service control system to the switching centre according to the first signalling protocol.

4. A method according to claim 1, wherein the third signal, transmitted from the terminal to the service control system, includes data relating to the identity of the terminal setting up the transaction.

5. A method according to claim 1, wherein the first signal, transmitted form the switching centre to the service control system, includes data relating to the location of the terminal setting up the transaction.

6. A method according to claim 5, wherein the service control system transmits a message to the terminal indicative of the location of the terminal.

7. A method according to claim 1, wherein the exchange of the second and third signals between the service control system and the terminal comprises a request for, and return of, an authorisation code, wherein performance of subsequent steps of the process is conditional on the correct receipt of the authorisation code.

8. A method according to claim 7, wherein the terminal transmits the authorisation code automatically on receipt of the request.

9. A method according to claim 1, wherein the terminal and the switching centre communicate by means of a mobile telephone network.

10. A method according to claim 1, wherein the fourth, transaction control, signal is according to the first signalling protocol.

11. A method according to claim 1, wherein the first signalling protocol is according to the Intelligent Network Applications Part (INAP) standard.

12. A method according to claim 1, wherein the third, reply, signal is according to the same protocol as the second signal.

13. A method according to claim 12, wherein the system operates according to the GSM standard, making use of the Unstructured Supplementary Service Data (USSD) capability for exchange of the second and third signals between the service control system and the terminal.

14. A service control system for a telecommunications network, the service control system being capable of initiating a telecommunications transaction with at least associated first, second, third and fourth signals, said system comprising:

means for receiving said first, transaction request, signal according to a first signalling protocol, the transaction request relating to a specified terminal, transmitting means for transmitting, in response to the first signal, said second signal, to the specified terminal in relation to which the transaction request is received, for requesting information for said initiation of said transaction, the second signal being according to a signalling protocol other than the first signalling protocol;

means for receiving from the said terminal said third signal in response to the transmitted second signal, for providing said information, the third signal being according to a signalling protocol other than the first signalling protocol;

processing means for processing the third signal to generate an instruction to initiate the required transaction; and means controlled by the processing means for transmitting said fourth, transaction control, signal to a switching means of the telecommunications system instructing the switching means to initiate the transaction to be performed, the signalling protocols used the first, second, third and fourth signals all being suitable for carrying over a low bandwidth initial signalling path.

15. A service control system according to claim 14, wherein the processing means includes means to determine whether the transaction to be performed requires a high bandwidth communications path.

16. A service control system according to claim 14, further comprising means for transmitting to the switching means as part of the fourth signal, an instruction to set up a high bandwidth communications path in response to a determination by the processing means that such a path is required.

17. A service control system according to claim 14, wherein the processing means is arranged to identify the terminal setting up the transaction, from data carried in the third signal.

18. A service control system according to claims 14, wherein the service control system is arranged to identify the location of the terminal setting up the transaction from information contained in the first signal.

19. A service control system according to claim 18, including means for generating a message indicative of the location of the terminal.

20. A service control system according to claim 14, having means for transmitting as part of the second signal a request for an authorisation code, authentication means to authenticate an authorisation code carried in the third signal, and means controlled by the authentication means to control the processing means.

21. A service control system according to claim 14, wherein the fourth, transaction control, signal is according to the first signalling protocol.

22. A service control system according to claim 14, wherein the means for transmitting and receiving signals according to the first signalling protocol are configured to operate according to the Intelligent Network Applications Part (INAP) standard.

23. A service control system according to claim 14, wherein the third, reply, signal is according to the same protocol as the second signal.

24. A service control system according to claim 14, in association with a cellular mobile telephone network.

25. A service control system according to claim 24, wherein the associated cellular telecommunications network operates according to the GSM standard, wherein the means for transmitting and receiving signals to and form terminals according to the second signalling protocol are configured to operate according to the Unstructured Supplementary Service Data (USSD) capability.

26. A telecommunications system capable of initiating a telecommunications traction with at least associated firstm second, third and fourth signals, said system comprising:

a specified terminal, a switching centre from receiving said first, transaction request, signal according to a first signalling protocol, he transaction request relating to the specified terminal, a service control system for transmitting said second signal, to the specified terminal in relation to which the transaction request is received, to request information for said initiating of said transaction, the second signal being according to a signalling protocol other than the first signalling protocol;

the service control system receiving from said terminal said third signal in response to the transmitted second signal to provide said information, the third signal being according to a signalling protocol other than the first signalling protocol;

the service control system processing the third signal to generate an instruction to initiate the required transaction and transmitting said forth, transaction control, signal to the switching centre instructing the switching centre to initiate the transaction to be performed, the signalling protocols used for the first, second, third and fourth signals all being suitable for carrying over a low bandwidth initial signalling path interconnecting the specified terminal, the switching centre, and the service control system.

* * * * *

UNITED STATES PATENT AND TRADEMARK OFFICE
CERTIFICATE OF CORRECTION

PATENT NO. : 6,192,237 B1  
APPLICATION NO. : 09/029572  
DATED : February 20, 2001  
INVENTOR(S) : Clapton et al.

Page 1 of 1

It is certified that error appears in the above-identified patent and that said Letters Patent is hereby corrected as shown below:

In the Claims:

Column 6, line 19 (fifth line of claim 1), change "a transmitting" to -- a terminal, a switching centre, and a service control system; transmitting an initial signal from the terminal to the switching centre over the initial switching path; transmitting --

Column 6, line 58 (second line of claim 5), change "form" to -- from --

Column 8, line 31 (fourth line of claim 25), change "form" to -- from --

Column 8, line 36 (second line of claim 26), change "traction" to -- transaction --

Column 8, line 36 (second line of claim 26), change "firstm" to -- first --

Column 8, line 40 (fifth line of claim 26), change "from" to -- for --

Column 8, line 42 (seventh line of claim 26), change "he" to -- the --

Column 8, line 57 (twenty-first line of claim 26), change "forth" to -- fourth --

Signed and Sealed this  
Twenty-sixth Day of November, 2013

Margaret A. Focarino  
*Commissioner for Patents of the United States Patent and Trademark Office*